Feb. 10, 1959  F. J. HUDDLESTON ET AL  2,873,364
SUBMINIATURE SERVOMECHANISM AMPLIFIER
Filed July 13, 1954
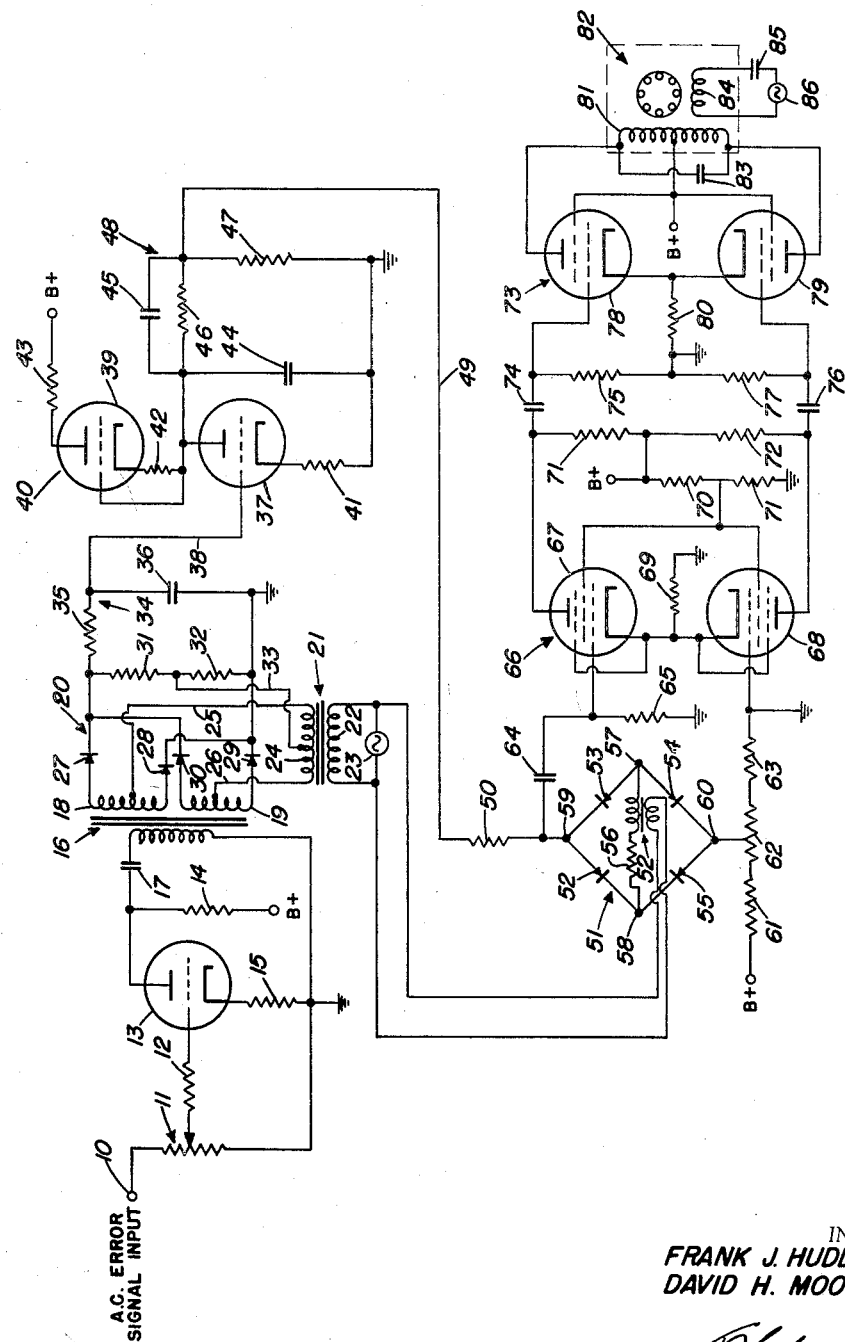
INVENTOR
FRANK J. HUDDLESTON
DAVID H. MOONEY, JR.
BY 
ATTORNEY

United States Patent Office 2,873,364
Patented Feb. 10, 1959

2,873,364

SUBMINIATURE SERVOMECHANISM AMPLIFIER

Frank J. Huddleston, Millersville, and David H. Mooney, Jr., Glen Burnie, Md., assignors, by mesne assignments, to the United States of America as represented by the Secretary of the Navy Application July 13, 1954, Serial No. 443,186

2 Claims. (Cl. 250—27)

This invention relates to a subminiature position instrument servomechanism which is actuated by an alternating current two phase motor utilizing an alternating current error signal, but employs differentiating networks for stabilization which operate on the rate of change of a direct current error signal.

One method of stabilization which has been previously used with alternating current systems is tachometric feedback. In this type of system an alternating current generator is connected to the output motor shaft and the generated electromotive force is fed back into the amplifier with such polarity as to cause negative feedback. However, this type of stabilization has the disadvantage of a large generator connected to the motor. In aircraft and similar applications, small size and weight are of prime importance. Furthermore, the ordinary alternating current amplifier used with the foregoing type of system requires a very low value of null voltage to avoid saturation of the amplifier. However, low null voltages are difficult to obtain because of the out-of-phase component of voltage which is caused by stray capacitances.

The instant invention overcomes the drawbacks of the prior art. As stated above, in this invention an alternating current error signal is utilized to actuate a subminiature position instrument servomechanism. The stabilization of the servomechanism is achieved by utilizing differentiation networks which operate on the rate of change of a direct current error signal. The operation of the circuit of this invention is as an amplifier in a positional feedback control system. The purpose of the amplifier is to provide an amplified voltage to a servo-motor proportional to the error signal input. In the instant system an alternating voltage error signal is amplified, phase detected, and rectified to give a direct voltage of a magnitude and polarity which is dependent on the phase of the alternating voltage error signal. The resulting direct voltage signal thus obtained is then fed through a differentiation network for ultimate stabilization of the servo-motor. This direct voltage could be used to drive a direct current motor but this type of motor is not too practical in aircraft due to rapid brush wear at high altitude. The direct voltage is therefore modulated to provide an alternating voltage of a phase and magnitude dependent on the polarity and magnitude of the direct voltage. This alternating voltage is then phase inverted and amplified to supply the proper drive to an alternating current induction motor.

It is therefore one object of this invention to disclose a circuit for an alternating current servo-motor which is actuated by an alternating current error signal but employs differentiating networks for stabilization which operate on the rate of change of a direct current error signal.

It is another object of this invention to disclose a servo system which has small size and weight.

Other objects and many of the attendant advantages of this invention will be readily appreciated as the same becomes better understood by reference to the following detailed description when considered in connection with the accompanying drawing.

In the drawing numeral 10 depicts the terminal where an alternating voltage error signal is applied to the circuit. This signal is coupled through potentiometer 11 and grid biasing resistor 12 to the grid of amplifying triode 13. The plate of triode 13 is coupled to B+ through load resistor 14. The cathode of triode 13 is coupled to ground through cathode resistor 15. The output of triode 13 is coupled to the primary of transformer 16 through coupling condenser 17. The outputs from split secondaries 18 and 19 of transformer 16 are coupled to a full wave phase detector 20 where the amplified signal is demodulated to a direct voltage. A transformer 21 has a primary winding 22 which is connected across a reference source of alternating voltage 23. The secondary winding 24 of transformer 21 has its ends center tapped to split secondary windings 18 and 19 of transformer 16 by means of conductors 25 and 26, respectively. The terminals of secondary winding 18 are coupled to unidirectional devices 27 and 28 and the terminals of secondary winding 19 are coupled to unidirectional devices 29 and 30. One side of resistor 31 is coupled to the common junction of the output sides of unidirectional devices 27 and 30. One side of resistor 32 is coupled to the common junction of the output sides of unidirectional devices 28 and 29. Resistors 31 and 32 are of equal magnitude. The common junction of resistors 31 and 32 is coupled to the center tap of the secondary winding 24 of transformer 21 by means of conductor 33. The operation of the phase detector 20 is as follows:

First of all, it can be readily seen that unidirectional devices 27, 28, 29 and 30 give full wave rectification to alternating voltages applied thereto. When the voltage across the secondary of transformer 24 is of the same polarity as that across the secondaries of transformer 16, current will flow through either secondary 18 or 19 depending on the specific polarity of the voltages. Because of the center tapped relationship of the terminals of winding 24 with windings 18 and 19, and because of the fact that the common junction of resistors 31 and 32 is center tapped to winding 24, the output across one of resistors 31 or 32 will be the sum of the voltage through one of the secondary windings 18 or 19 (whichever is conducting) plus the amount of voltage induced in either of these secondaries by the primary of transformer 16. The output across the other of the resistors 31 or 32 will be equal to the difference between the voltage through the other one of the secondary windings 18 or 19 (whichever is conducting) minus the amount of voltage induced in either of these secondaries by the primary of transformer 16. The voltages thus produced across each of resistors 31 and 32 are rectified votages of opposite polarity. Thus, since resistors 31 and 32 are connected in series and always have rectified voltages of opposite polarity across them, the voltage output across these two resistors 31 and 32 is always the algebraic sum of the voltages applied to these resistors. Thus it can be seen that the error signal which is developed across the split secondaries of transformer 16 are added to and subtracted from the reference voltage which is applied across the secondary of transformer 21. The resulting alternating voltages are rectified and subtracted. The two pulsating direct voltages which appear across resistors 31 and 32 are equal only when the component of the error signal in phase with the reference voltage is zero. When the component of the error voltage in phase with the reference voltage is not zero, a pulsating direct voltage output, which is proportional to the error voltage, is produced across resistors 31 and 32. The polarity of this output depends on whether the error voltage is in phase or 180° out of phase with the reference voltage. No net pulsating direct voltage is produced for an alternating error voltage which is 90° out of phase with the reference voltage. It can thus be seen that phase detector and rectifier 20 produces a pulsating direct voltage across resistors 31 and 32, the magnitude and polarity of said voltage depending on the phase relationship between the alternating error voltage and the alternating reference voltage.

A filtering network 34 consisting of resistor 35 in series with condenser 36 is coupled across resistors 31 and 32. This network filters the voltage produced by phase detector 20. The filtered output is taken from the junction of resistor 35 and condenser 36 and applied to the grid of triode 37 by means of conductor 38.

Triodes 37 and 39 form a series compensated direct voltage amplifier 40 which has negligible drift, high gain, and serves to isolate the following differentiating network 48 from the phase detector. The cathode of triode 37 is coupled to ground through cathode resistor 41. The plate of triode 37 is coupled to the cathode of triode 39 through resistor 42. The grid bias for triode 39 is obtained from the plate of triode 37. The plate of triode 39 is coupled to B+ through load resistor 43.

A differentiating network 48 is coupled to the output of the plate of triode 37. This network is employed for stabilization of the servo-motor. The circuit consists of capacitor 44 coupled from the plate of triode 37 to ground. Coupled across capacitor 44 are series connected resistors 46 and 47. Capacitor 45 is coupled in parallel across resistor 46. This stabilizing circuit 48 produces a direct voltage output at the junction of resistors 46 and 47 which is proportional to the input voltage from the plate of triode 37 plus a voltage which is equal to the rate of change of the input voltage. For a sudden change in the input signal the differentiation network gives a signal proportional to the rate of change and of such polarity to partially counteract the action of the steady state error signal. In like fashion if the servo should tend to oscillate, the output of the network will have a component tending to counteract this oscillation.

The output signal from stabilizing circuit 48 is coupled from the junction of resistors 46 and 47, by means of conductor 49 and resistor 50, to modulator 51. The modulator 51 acts as a switch which is synchronized by the line voltage output from the primary winding of transformer 52 whereby the direct voltage input to the modulator from differentiating network 48 alternately feeds through to the output of modulator 51 or is shorted out to thereby produce a square wave of the same frequency as the voltage produced by alternating voltage source 23. The modulator consists of unidirectional devices 52, 53, 54 and 55 which form a diode bridge, the unidirectional devices being connected in the manner shown. Resistor 56 and the secondary of transformer 52 are coupled in series across terminals 57 and 58 of the bridge. The output from differentiating network 48 is coupled to terminal 59 of the bridge. Terminal 60 of the bridge is coupled to B+ through resistor 61 and through potentiometer 62. Potentiometer 62 is coupled to ground through resistor 63. In operation the alternating voltage provided by transformer 52 is always considerably larger than the direct voltage input to terminal 59. The alternating voltage therefore alternately short circuits and open circuits terminals 57 and 58 on opposite half cycles. Since the direct voltage is smaller than the alternating voltage, it will have no effect on controlling the switching action. On half cycles when terminals 57 and 58 are short circuited, terminals 59 and 60 are shorted to terminals 58 and 57, respectively, which in effect results in a short circuit across terminals 59 and 60. On half cycles when terminals 57 and 58 are open circuited, terminals 59 and 60 are also open circuited so that the direct voltage input to modulator 51 at terminal 59 alternately feeds through to the output of modulator 51. The resulting output is a square wave of the same frequency as that of alternating voltage source 23 with an amplitude proportional to the direct voltage input and either in phase or 180° out of phase with the line voltage of source 23.

The square wave output from modulator 51 is coupled through the coupling circuit consisting of capacitor 64 and resistor 65 to phase inverter 66 which serves the function of changing the phase of the output of modulator 51 so that the push pull power amplifier 73 can be properly fed. The output of the coupling circuit is taken from the junction of capacitor 64 and resistor 65 and applied to the control grid of pentode 67. The cathode of pentode 67 is coupled to the cathode of pentode 68, both of these cathodes being coupled through cathode biasing resistor 69 to ground. The screen grids of pentodes 67 and 68 are coupled to B+ through biasing resistor 70 which is in turn coupled to ground through resistor 71, the magnitudes of these resistors determining the screen grid bias of the pentodes. The suppressor grids of the pentodes 67 and 68 are coupled to their respective cathodes. The plate of pentode 67 is coupled to B+ through load resistor 71, and the plate of pentode 68 is coupled to B+ through load resistor 72. The output of phase inverter 66 is taken at the plates of pentodes 67 and 68 and consists of two square waves of equal magnitude and 180° out of phase with each other.

These two square waves are coupled to the push-pull power amplifier 73. A coupling circuit, consisting of capacitor 74 and resistor 75 in series, couples the plate of pentode 67 to ground. A coupling circuit, consisting of capacitor 76 and resistor 77 in series, couples the plate of pentode 68 to ground. The outputs of these coupling circuits is taken at the junctions of the respective condensers and resistors. The output from pentode 67 is coupled to the control grid of tetrode 78, and the output of pentode 68 is coupled to the control grid of tetrode 79. Tetrodes 78 and 79, which comprise the push-pull power amplifier 73, have their cathodes coupled through biasing resistor 80 to ground. The screen grids of tetrodes 78 and 79 are coupled to B+ and the plates of these tetrodes are coupled directly to B+ through the control winding 81 of the two phase alternating current motor 82. This direct coupling is for the purpose of minimizing space requirements. The impedance of the load is matched to the output impedance of tubes 78 and 79 by tuning the inductance of the control winding 81 with a parallel capacitor 83. The other winding 84 of motor 82 is coupled through condenser 85 to the line source of alternating current 86.

It can thus be seen that a servo system has been disclosed which utilizes an alternating voltage error signal but employs differentiating networks for stabilization which operate on the rate of change of a direct current error signal. The direction of rotation of motor 82 is determined by the phase relationship of the voltages applied to windings 81 and 84 thereof. This phase relationship is determined by the phase of the output from modulator 51, which is in turn determined by the polarity of the direct voltage output from phase detector 20. The magnitude of the voltage applied to winding 81 of motor 82 is proportional to the error signal input.

Obviously many modifications and variations of the present invention are possible in the light of the above teachings. It is therefore to be understood that within the scope of the appended claims the invention may be practiced otherwise than as specifically described.

Having thus described our invention, we claim:

1. A circuit for a servomotor which is actuated by an alternating current voltage error signal but employs differentiating networks for stabilization, said circuit comprising: means for coupling an alternating current voltage error signal to said circuit; means connected to the coupling means for phase detecting and demodulating said alternating current voltage error signal and for producing a first direct current voltage having a magnitude and polarity which is a function of the amplitude and phase of the alternating current voltage error signal; differentiating means for converting said first direct current voltage into a second direct current voltage having a magnitude which is proportional to said first direct current voltage plus the rate of change of said first direct current voltage; modulating means for modulating said second direct current voltage and thereby producing an alternating current voltage having the proper frequency, magnitude and phase for the operation and stabilization of the servomotor; a series compensated direct current amplifier connected between said differentiating means and said phase detecting and demodulating means for isolating said differentiating means from said phase detecting and demodulating means and output terminals for connecting said alternating current voltage to the servomotor.

2. A circuit for obtaining stabilization for a servomechanism having a servomotor, said circuit consisting of input terminals for connection to a source of alternating current voltage error signal for said servomechanism; a source for producing a reference voltage having the same frequency as said alternating current voltage error signal; full wave phase detector means connected to said input terminals and said source for rejecting any voltages in quadrature with said alternating current voltage error signal and for producing a first direct current voltage proportional to the alternating current voltage error signal and having a polarity that depends upon whether the alternating current error voltage is in-phase or 180 degrees out-of-phase with said reference voltage; differentiating means for converting said first direct current voltage into a second direct current voltage having a magnitude which is proportional to the amplitude of said first direct current voltage plus the rate of change of said first direct current voltage; means for modulating said output signal at the frequency of said reference voltage for producing a square wave having an amplitude proportional to said second direct current voltage and having a phase which is either in-phase or 180 degrees out-of-phase with said reference voltage depending upon the polarity of said second direct current voltage; and means for connecting only said square wave to said servomotor.

References Cited in the file of this patent

UNITED STATES PATENTS

| | | |
|---|---|---|
| 2,088,654 | Hull | Aug. 3, 1937 |
| 2,632,872 | Warsher | Mar. 24, 1953 |
| 2,670,409 | Cooper | Feb. 23, 1954 |
| 2,729,772 | Perkins | Jan. 3, 1956 |
| 2,769,122 | Moreines et al. | Oct. 30, 1956 |
| 2,785,306 | Johnson et al. | Mar. 12, 1957 |